(12) United States Patent
Gurevitz et al.

(10) Patent No.: US 8,132,085 B2
(45) Date of Patent: Mar. 6, 2012

(54) METHOD AND APPARATUS FOR FRAME CONTROL HEADER DECODING USING CYCLIC SHIFTING OF BITS

(75) Inventors: Assaf Gurevitz, Ramat Hasharon (IL); Uri Perlmutter, Holon (IL); Tzahi Weisman, Mevaseret Zion (IL); Assi Jakoby, Herzelia (IL)

(73) Assignee: Intel Corporation, Santa Clara, CA (US)

( * ) Notice: Subject to any disclaimer, the term of this patent is extended or adjusted under 35 U.S.C. 154(b) by 564 days.

(21) Appl. No.: 11/858,471

(22) Filed: Sep. 20, 2007

(65) Prior Publication Data
US 2010/0046547 A1 Feb. 25, 2010

(51) Int. Cl.
*H03M 13/03* (2006.01)
(52) U.S. Cl. .......................................... 714/786; 714/776
(58) Field of Classification Search ................. 704/275; 375/341; 714/755, 794, 795, 796, 786, 776
See application file for complete search history.

(56) References Cited

U.S. PATENT DOCUMENTS

| | | | |
|---|---|---|---|
| 6,587,822 B2 * | 7/2003 | Brown et al. | 704/275 |
| 7,337,383 B1 * | 2/2008 | von der Embse | 714/755 |
| 2005/0111592 A1 * | 5/2005 | Yee | 375/341 |
| 2009/0041166 A1 * | 2/2009 | Patel et al. | 375/341 |

* cited by examiner

*Primary Examiner* — David Ton
(74) *Attorney, Agent, or Firm* — Cool Patent, P.C.; Joseph P. Curtin

(57) ABSTRACT

A method and apparatus for decoding a frame control header message in a wireless communication transmission are disclosed. The method comprises assuming at least some of the bits comprising the frame control header message are constant across multiple frames or are known a priori and generating metrics at least from the bits of the frame control header message that are assumed to be constant or are known a priori. The method further comprises decoding the metrics, for example, with a Viterbi decoder or using chase combining, to yield the decode frame control header message.

20 Claims, 4 Drawing Sheets

METHOD AND APPARATUS FOR FRAME CONTROL HEADER DECODING USING CYCLIC SHIFTING OF BITS

FIELD OF THE INVENTION

The present invention relates generally to improved methods and apparatus for decoding Frame Control Headers (FCHs) in wireless communication protocols used by wireless communication devices.

BACKGROUND OF THE INVENTION

A Frame Control Header (FCH) is used in a range of the Institute of Electrical and Electronics Engineers (IEEE) wireless communication protocols, such as the 802.16 standard family of communication protocols, commonly referred to as WiMAX (Worldwide Interoperability for Microwave Access), and in particular the 802.16e protocol. The FCH specifies a burst profile and the length of one or more downlink (DL) bursts that immediately follow the FCH in a data frame.

The FCH consists of 24 information bits divided into several fields. The FCH is encoded by the transmitter, typically a base station, and must be decoded by the receiver, typically a subscriber station. The FCH is the first message that a subscriber station must decode for successful entry into, for example, a WiMAX 802.16e communication network. Failure to do so may prevent the subscriber station from entering the network and increase the overall outage probability.

The problem becomes severe in a reuse-one WiMAX system (1×3×1), which uses three-sector base stations. All neighbour base stations share the same frequency band and the Signal-to-Interference-plus-Noise Ratio (SINR) conditions on the received signal are very low and therefore the probability that the FCH is decoded correctly is reduced.

BRIEF DESCRIPTION OF THE DRAWINGS

In order that the invention may be readily understood and put into practical effect, reference now will be made to embodiments of the present invention with reference to the accompanying drawings, wherein like reference numbers refer to identical elements. The drawings are provided by way of example only, wherein.

Figure 1:
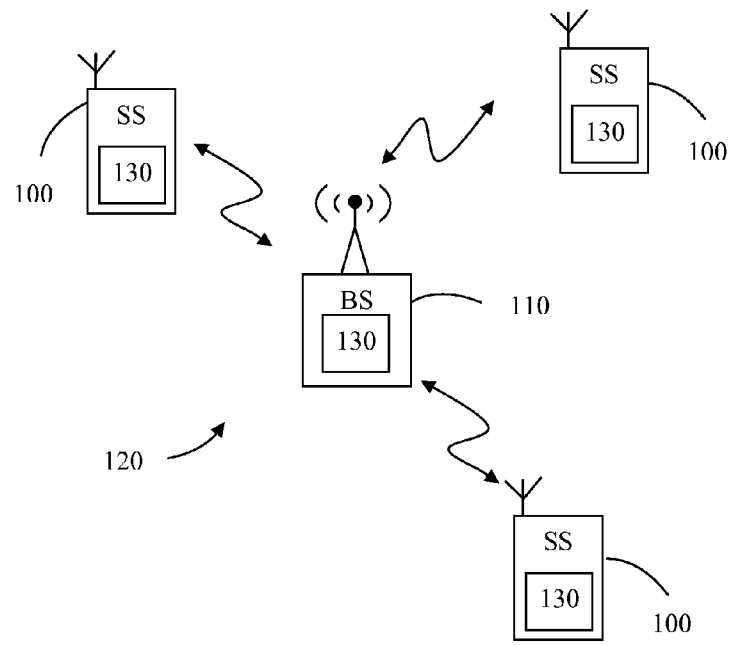
FIG. 1 is a schematic diagram illustrating a wireless communication network.

Skilled addressees will appreciate that elements in the figures are illustrated for simplicity and clarity and have not necessarily been drawn to scale. For example, the relative dimensions of some of the elements in the figures may be distorted to help improve understanding of embodiments of the present invention.

DETAILED DESCRIPTION

Before describing embodiments that are in accordance with the present invention it should be understood that the embodiments reside primarily in combinations of method steps and apparatus components related to decoding frame control header messages in wireless communication transmissions. Accordingly, the apparatus components and method steps have been represented where appropriate by conventional symbols in the drawings, showing only those specific details that are relevant to understanding the embodiments of the present invention such that the disclosure is not obscured with details that will be readily apparent to those of ordinary skill in the art.

In this specification, the terms "comprises," "comprising," "includes", "including" or any other variation thereof, are intended to cover a non-exclusive inclusion, such that a method, process, article or apparatus that comprises a list of elements does not include only those elements, but may include other elements not expressly listed or inherent to such method, process, article or apparatus. An element preceded by, for example, "comprises a . . . " does not, without more constraints, preclude the existence of additional identical elements in the method, process, article or apparatus that comprises the element.

It will be appreciated that embodiments of the invention herein described may be comprised of one or more conventional processors to implement, in conjunction with certain non-processor circuits, some, most, or all of the functions of decoding frame control header messages in wireless communication transmissions as herein described. The non-processor circuits may include, but are not limited to, a radio receiver, a radio transmitter, signal drivers, clock circuits, power source circuits, and user input devices. As such, these functions may be interpreted as a method for decoding frame control header messages in wireless communication transmissions. Alternatively, some or all functions could be implemented by a state machine that has no stored program instructions, or in one or more application specific integrated circuits (ASICs), Field-Programmable Gate Arrays (FPGAs), or other dedicated circuitry, in which each function or one or more combinations of the functions are implemented as custom logic. A combination of the two approaches could also be used. Thus, methods and means for these functions have been described herein. Further, it is expected that one of ordinary skill in the art, when guided by the disclosure herein, will be readily capable of generating such processors and/or non-processor circuits with minimal experimentation.

With reference to FIG. 1 and in accordance with embodiments of the present invention, a schematic diagram illustrates subscriber stations (SS) 100 communicating with a base station (BS) 110 in a wireless communication network 120. Embodiments of the present invention can be implemented in, and are applicable to, wireless communication devices, such as, but not limited to, mobile telephones, notebook or laptop computers, personal digital assistants (PDAs), portable multimedia devices, mobile internet devices (MIDs), ultra mobile PCs (UMPCs), ultra mobile devices (UMDs) and other wireless communication devices. Implementation of embodiments of the present invention in wireless communication devices, such as the subscriber stations 100 and the base station 110, as described above is illustrated in FIG. 1 by modules 130.

Figure 2:
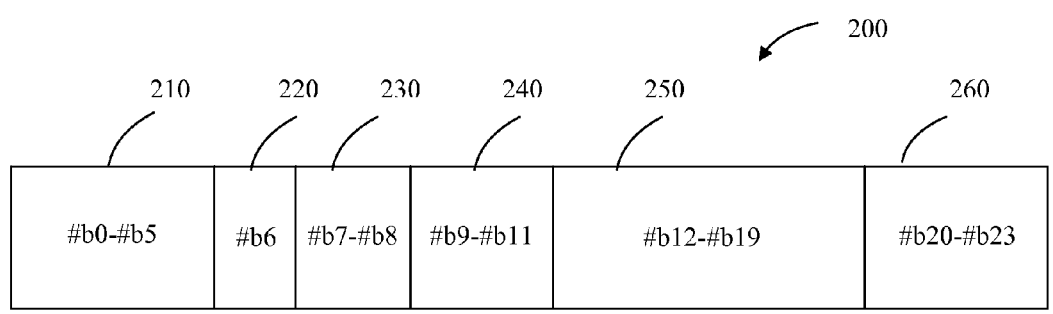
FIG. 2 is a schematic diagram illustrating the structure of a known frame control header used in wireless communications.

With reference to FIG. 2, a Frame Control Header (FCH) message 200 consists of 24 information bits divided into several fields. The various FCH bit fields and their possible values are described hereinafter. It will be shown that in a reuse-one scenario, in which all neighbour base stations share the same frequency band, most of the bits, except for the bits defining map length, are known in advance, whereas in other, non-reuse-one scenarios, most of the bits, except for the bits defining map length, can be assumed to be constant between frames.

As shown in FIG. 2, the FCH message 200 contains a first field 210 comprising bits #b0-#b5. These bits describe the used sub-channel bitmap, which signifies which of the six major groups are active. In a reuse-one scenario, all of the major groups are active and therefore these bits equal 0x3F (all ones—111111). In a non-reuse-one scenario, the first field 210 can be assumed to be constant because the bitmap should not change between frames. A second field 220 of the FCH 200 comprises bit #b6, which is a reserved bit. In a reuse-one scenario, this bit is set to zero according to the 802.16e standard. In a non-reuse-one scenario, this bit is constant between frames. The FCH message 200 contains a third field 230 comprising bits #b7-#b8 for a Repetition Coding Indication, which specifies the repetition coding on the downlink maps. In a reuse-one scenario, the repetition on the DL-MAP is always 6 (110). In a non-reuse-one scenario, this field is constant between frames. A fourth field 240 of the FCH 200 comprises bits #b9-#b11 for a Coding Indication, which indicates the Forward Error Correction (FEC) encoding code used for the DL-MAP. In a reuse-one scenario, the FEC encoding is a Convolutional Turbo Code (CTC) and in other scenarios this field is constant between frames. The FCH message 200 contains a fifth field 250 comprising bits #b12-#b19, which is the downlink map length. These bits are unknown in advance and can not be assumed to be constant between frames. A sixth field 260 of the FCH message 200 comprises bits #b20-#b23, which are more reserved bits. In a reuse-one scenario, the reserved bits are set to zero according to the 802.16e standard and in other scenarios, the reserved bits can be assumed to be constant between frames.

Hence, only the fifth field 250 comprising the 8-bits specifying the downlink map length is an unknown field. It will be noticed that the map length field 250 comprises 8 unknown bits out of a total of 24 bits of the FCH message 200. Therefore, two thirds of the FCH message 200 can considered as either known or constant and the methods for decoding frame control header messages in wireless communication transmissions in accordance with embodiments of the present invention can be applied to achieve improved decoding performance.

Embodiments of the present invention comprise a method of decoding a coded FCH message in a wireless communication transmission including generating coded metrics at least from bits comprising the FCH message that are assumed to be constant across multiple frame control header messages or are known a priori and decoding the coded metrics to yield the FCH message 200.

In a reuse-one (1×3×1) scenario, most of the bits except for bits #b12-#b19 comprising the downlink (DL) map length can be assumed to be known a priori. In this case, this knowledge is applied to a decoder to yield a decoding performance improvement. These embodiments of the invention relate to the knowledge of the bits in advance rather than to a certain implementation of a decoder that exploits their knowledge.

In other, non-reuse-one scenarios, a-priori knowledge of the bits can not be assumed. In these cases, embodiments of the invention use chase combining (open-loop Hybrid Automatic Repeat Requests (HARD)) on all fields of the FCH 200, except for the fifth field 250 comprising the DL map length, by assuming that the remaining fields, i.e., the first to fourth fields 210-240 and the sixth field 260, do not change between frames.

Implementation of embodiments of the present invention in reuse-one (1×3×1) scenarios will now be described in more detail followed by further detail of implementation of embodiments of the present invention in other, non-reuse-one scenarios.

Figure 3:
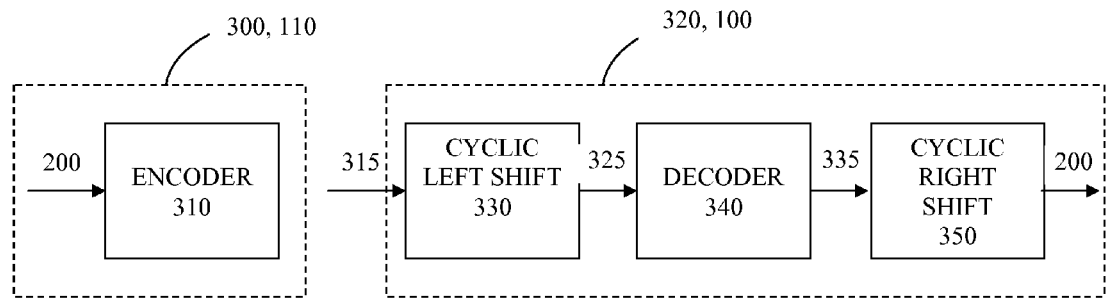
FIG. 3 is a schematic diagram illustrating an apparatus for decoding the frame control header according to some embodiments of the present invention.

Referring to FIG. 3, the FCH message 200 is encoded at a transmitter 300, such as the base station 110, by an encoder 310. In the 802.16e standard, for example, the encoder 310 is typically a rate ½ convolutional encoder, which is described in more detail with reference to FIG. 4. The encoded FCH message 315 is received by an apparatus 320, such as one of the subscriber stations 100, to decode the encoded FCH message 315, for example, to enable the subscriber station 100 to enter the wireless communication network 120. The apparatus 320 is in the form of a receiver 320 and comprises a decoder 340 for decoding coded metrics generated at least from bits comprising the frame control header message that are known a priori, to yield the frame control header message 200. The apparatus 320 comprises a cyclic left-shifting module 330 and a cyclic right-shifting module 350, each coupled to be in communication with the decoder 340.

At the receiver 320, the encoded FCH message 315 passes through the cyclic left-shifting module 330 where the encoded FCH message is cyclically left shifted k places. The cyclically left-shifted encoded FCH message 325 is input to the decoder 340 where it is decoded. The decoded output 335 from the decoder 340 passes through the cyclic right-shifting module 350 where the decoded, cyclically left-shifted FCH message 335 is cyclically right shifted by k/2 places to yield the decoded FCH message 200.

Figure 4:
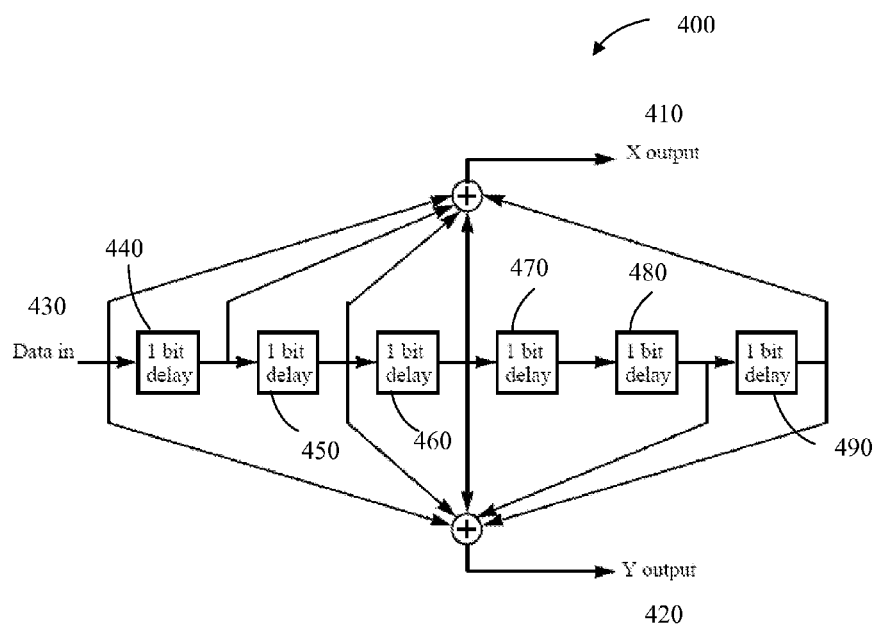
FIG. 4 is a schematic diagram illustrating a known rate ½ convolutional encoder used in wireless communications.

With reference to FIG. 4, in the rate ½ convolutional encoder 400 used in the 802.16e standard, two output coded bits, X output 410 and Y output 420, are generated for each incoming information bit 430. Therefore, the rate ½ convolutional encoder 400 encodes the 24-bit FCH message 200 into a 48-bit encoded message, encoded FCH message 315. The rate ½ convolutional encoder 400 comprises a series of 1-bit delays 440, 450, 460, 470, 480, 490. The outputs of some of the delays are summed with the original input 430 to generate the X and Y outputs 410, 420. The X outputs 410 are generated by summing bits comprising the original input 430 with the respective output of the first, second, third and sixth delays 440, 450, 460, 490. The Y outputs 420 are generated by summing the bits comprising the original input 430 with the respective output of the second, third, fifth and sixth delays 450, 460, 480, 490.

The rate ½ convolutional encoder 400 is a tail-biting encoder, which uses the last 6 bits of the FCH message 200 to initialize the memory of the encoder. Hence, the memory of the encoder is initialized with 2 unknown bits from the fifth field 250 and 4 known bits from the sixth field 260 of the FCH message 200. It is known that for a tail-biting encoder, the coded metrics generated by the encoder can be cyclically shifted at a decoder input and still be decoded correctly as long as the decoder output is shifted oppositely.

With reference to the 24-bit FCH message 200 shown in FIG. 2 comprising bits #b0-#b23, the first 12 bits, bits #b0-#b11 of the first to fourth fields 210-240 and the last 4 bits, bits #b20-#b23 of the sixth field 260, are known and the 8 bits of the fifth field 250 therebetween, bits #b12-#b19, are unknown. According to embodiments of the invention, the left shifting module 330 applies 12 cyclic shift-left operations on the received metrics comprising the coded bits prior to decoding by the decoder 340. This ensures that the first 12 coded bits and the last 8 coded bits are known in advance to the decoder 340. Hence, embodiments of the present invention comprise left shifting the coded metrics before decoding in which at least some of the bits of the FCH message 200 are known a priori.

Figure 5:
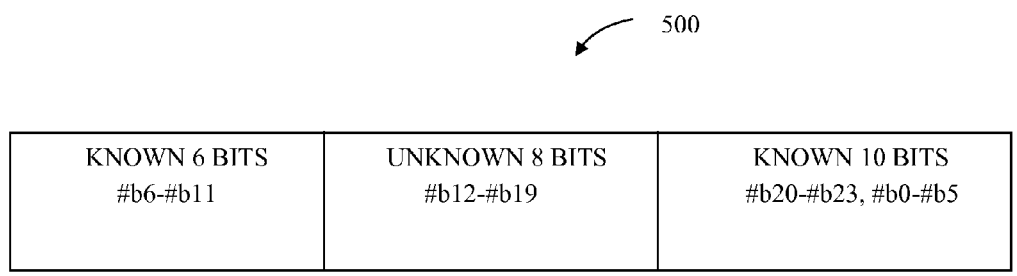
FIG. 5 is a schematic diagram illustrating the structure of the frame control header after left shifting in accordance with embodiments of the present invention.

FIG. 5 shows how the original FCH message 200 would look if 12 cyclic left shifts were performed on the coded stream, which corresponds to 6 left shifts on the original information message. In the left-shifted message 500, the first 6 bits, bits #b6-#b11 and the last 10 bits, bits #b20-#b23 and #b0-#b5 are known and bits #b12-#b19 of the DL map length therebetween are unknown.

Figure 6:
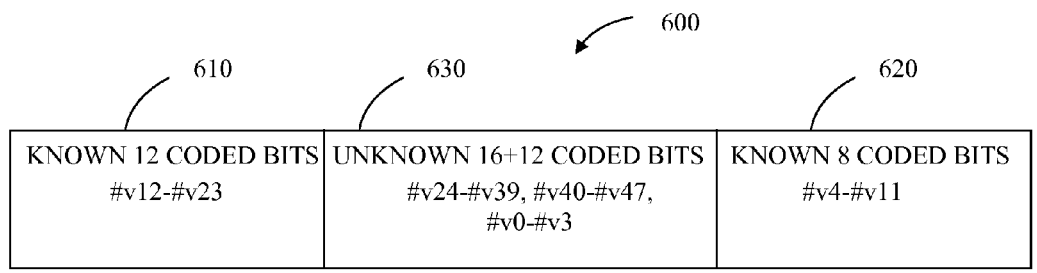
FIG. 6 is a schematic diagram illustrating the structure of an encoded, left shifted frame control header in accordance with embodiments of the present invention.

With reference to FIG. 6, the left-shifting module 330 of the receiver 320 applies 12 cyclic shift-left operations on the 48-bit encoded message received from the transmitter 300 to generate a 48-bit coded message in which the first 12 metrics 610, i.e., the first 12 coded bits #v12-#v23, and the last 8 metrics 620, i.e., the last 8 coded bits #v4-#v11, are known a priori. The 28 metrics 630 therebetween, i.e. 28 coded bits #v24-#v39, #v40-#v47 and #v0-#v3 are unknown. The decoder 340, which is a Viterbi decoder in accordance with some embodiments of the present invention, decodes the 48 bit coded message by using a log-likelihood ratio (LLR)=+a for the coded bits of the coded metrics=1 and using a LLR=−a for the coded bits of the coded metrics=0. The output of the decoder 340 is input to the cyclic right-shifting module 350 where it is cyclically right shifted by k/2 places, i.e. 6 places in this example, to yield the decoded FCH message 200. Hence, embodiments of the present invention comprise right shifting the metrics after decoding in which at least some of the bits of the FCH message 200 are known a priori.

Figure 7:
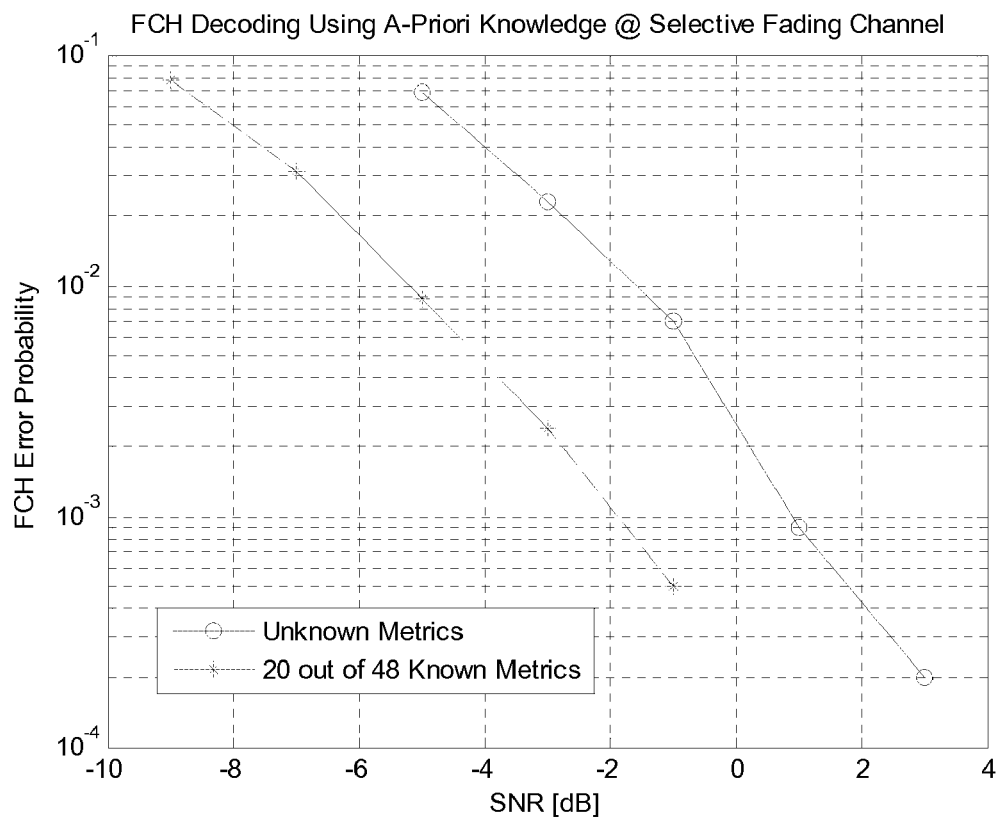
FIG. 7 is a graph illustrating the performance of embodiments of the present invention compared with a prior art decoder.

FIG. 7 demonstrates the improved performance of embodiments of the present invention for reuse-one scenarios using the Viterbi decoder when decoding the FCH message 200 versus the performance of a regular decoder. The simulation included a pedestrian B selective fading channel model using a Single Input, Multiple Output (SIMO) receiver. FIG. 7 shows the FCH error probability as a function of Signal-to-Noise Ratio (SNR) for unknown metrics compared with embodiments of the present invention in which 20 out of 48 coded metrics are known, as described in the example above. A performance gain of up to 3 dB is evident for embodiments of the present invention. Conversely, for a given SNR, embodiments of the present invention exhibit a FCH error probability that is about one order of magnitude less than that exhibited by the regular decoder.

As referred to above, for non-reuse-one scenarios, a priori knowledge of the bits cannot be assumed. Therefore, alternative embodiments of the present invention comprise assuming at least some of the bits comprising the FCH message 200 are constant across multiple frame control header messages in other, non-reuse-one (not 1×3×1) wireless communication schemes. These embodiments employ chase combining (open-loop HARQ) between frames over the constant fields of multiple frame control header messages that comprise the message. When one or more transmitted data blocks are incorrectly received by the receiver 320, the incorrectly transmitted blocks are stored by the receiver rather than being discarded. When the retransmitted blocks are received as part of the Automatic Repeat Request (ARQ), the incorrectly transmitted blocks and the retransmitted blocks are combined before being decoded by a decoder of an error correction code used in HARQ. This increases the probability of successful decoding.

Figure 8:
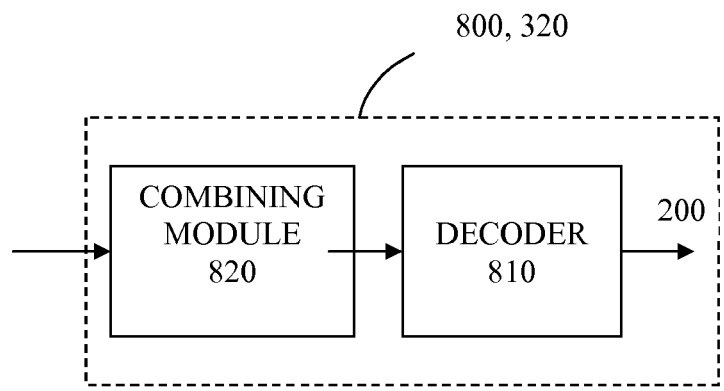
FIG. 8 is a schematic diagram illustrating an apparatus for decoding the frame control header according to some embodiments of the present invention.

With reference to FIG. 8, an apparatus 800 for decoding the encoded FCH message is in the form of the receiver 320 and comprises a decoder 810 for decoding coded metrics generated at least from bits comprising the frame control header message that are assumed to be constant across multiple frame control header messages to yield the frame control header message 200. The apparatus 800 comprises a combining module 820 coupled to be in communication with the decoder 810 for combining originally transmitted, incorrectly received constant fields of the FCH message and the retransmitted constant fields of the FCH message and achieving the combining gain.

Hence, in accordance with embodiments of the present invention, the originally transmitted constant fields of the FCH message and the retransmitted constant fields of the FCH message are combined to lower the Bit Error Rate (BER) probability in decoding the FCH message 200. The performance is improved by up to 3 dB after accumulating several FCH metrics. These embodiments of the present invention provide more robustness to the receiver 320 when the fields comprising reserved bits and/or Modulation and Coding Schemes (MCS) change during frames, or between BS vendors. Although these embodiments assume the constant FCH bits remain the same between frames, in the event of change, after several frames the system auto corrects itself to the new correct FCH bits and benefits from the combining gain.

Whilst open-loop HARQ produces significant improvement in performance by lowering the Bit Error Rate (BER) probability in decoding the FCH message 200, it is envisaged that alternative HARQ schemes can be employed in alternative embodiments of the present invention when bits comprising the FCH message 200 are assumed to be constant across multiple FCH messages.

Advantages of the various embodiments of the present invention thus include improving performance when decoding the FCH message 200 by generating coded metrics at least from bits comprising the FCH message 200 that are assumed to be constant across multiple FCH messages or are known a priori and decoding the coded metrics to yield the FCH message. Embodiments of the invention include employing an improved Viterbi decoder when at least some of bits comprising the FCH message 200 are known a priori and employing chase combining (open-loop HARQ) between frames over the constant fields of multiple FCH messages when at least some of the bits comprising the FCH message 200 are assumed to be constant. Improved performance in the region of 3 dB is observed by lowering the BER probability in decoding the FCH message 200. Hence, the likelihood of subscriber stations being unable to enter a communication network through failure to decode the FCH messages 200 is reduced, thus reducing the overall system outage probability.

In the foregoing specification, specific embodiments of the present invention have been described. One of ordinary skill in the art, however, appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

What is claimed:

1. A method, comprising:
   cyclically shifting a frame control header message in a wireless communication transmission a first predetermined number of bits in a first direction, the frame control header comprising a second predetermined number of bits;
   decoding the cyclically shifted frame control header message; and
   cyclically shifting the decoded frame control header message a third predetermined number of bits in a second direction, the second direction being opposite the first direction.

2. The method of claim 1, wherein decoding comprises decoding using a Viterbi decoder.

3. The method of claim 2, wherein the Viterbi decoder uses a log-likelihood ratio=+∞ for coded bits of metrics of the cyclically shifted frame control header message equal to 1 in which at least some of the bits of the frame control header message are known a priori.

4. The method of claim 2, wherein the Viterbi decoder uses a log-likelihood ratio=−∞ for coded bits of metrics of the cyclically shifted frame control header message equal to 0 in which at least some of the bits of the frame control header message are known a priori.

5. The method of claim 1, wherein at least some of the bits comprising the frame control header message are known a priori in a reuse-one wireless communication scheme in which a single frequency is used for all sectors and base stations.

6. The method of claim 1, wherein at least some of the bits comprising the frame control header message are constant across multiple frame control header messages in non-reuse-one wireless communication schemes.

7. The method of claim 1, further comprising employing chase combining between frames across constant fields of multiple frame control header messages in which at least some of the bits of the frame control header message are assumed to be constant.

8. The method of claim 1, wherein cyclically shifting the frame control header message in the first direction comprises cyclically left shifting the frame control header message, and
   wherein cyclically shifting the decoded frame control header message in the second direction comprises cyclically right shifting the decoded frame control header message.

9. The method of claim 1, wherein the second predetermined number is one-half the first predetermined number.

10. An apparatus for decoding a frame control header message in a wireless communication transmission, the frame control header message comprising a first predetermined number of bits, the apparatus comprising a decoder capable of decoding the frame control header message by cyclically shifting the frame control header message a second predetermined number of bits in a first direction, decoding the cyclically shifted frame control header message, and cyclically shifting the decoded frame control header message a third predetermined number of bits in a second direction, the second direction being opposite the first direction.

11. The apparatus of claim 10, wherein the decoder comprises a Viterbi decoder.

12. The apparatus of claim 10, wherein the Viterbi decoder uses a log-likelihood ratio=+∞ for coded bits of metrics of the cyclically shifted frame control header message equal to 1 in which at least some of the bits of the frame control header message are known a priori.

13. The apparatus of claim 10, wherein the Viterbi decoder uses a log-likelihood ratio=−∞ for coded bits of metrics of the cyclically shifted frame control header message equal to 0 in which at least some of the bits of the frame control header message are known a priori.

14. The apparatus of claim 10, wherein at least some of the bits comprising the frame control header message are known a priori in a reuse-one wireless communication scheme in which a single frequency is used for all sectors and base stations.

15. The apparatus of claim 10, wherein at least some of the bits comprising the frame control header message are assumed to be constant across multiple frame control header messages in non-reuse-one wireless communication schemes.

16. The apparatus of claim 10, wherein chase combining is employed between frames across constant fields of multiple frame control header messages in which at least some of the bits of the frame control header message are assumed to be constant.

17. The apparatus of claim 10, wherein cyclically shifting the frame control header message in the first direction comprises cyclically left shifting the frame control header message, and
   wherein cyclically shifting the decoded frame control header message in the second direction comprises cyclically right shifting the decoded frame control header message.

18. The apparatus of claim 10, wherein the second predetermined number is one-half the first predetermined number.

19. A processor for decoding a frame control header message in a wireless communication transmission, the frame control header message comprising a first predetermined number of bits, the processor decoding the frame control header message by cyclically shifting the frame control header message a second predetermined number of bits in a first direction, decoding the cyclically shifted frame control header message, and cyclically shifting the decoded frame control header message a third predetermined number of bits in a second direction, the second direction being opposite the first direction.

20. The processor of claim 19, wherein the processor comprises a Viterbi decoder.

* * * * *